Aug. 27, 1929.  C. W. PERRY  1,726,120
FILM CARRIER
Filed Sept. 25, 1928
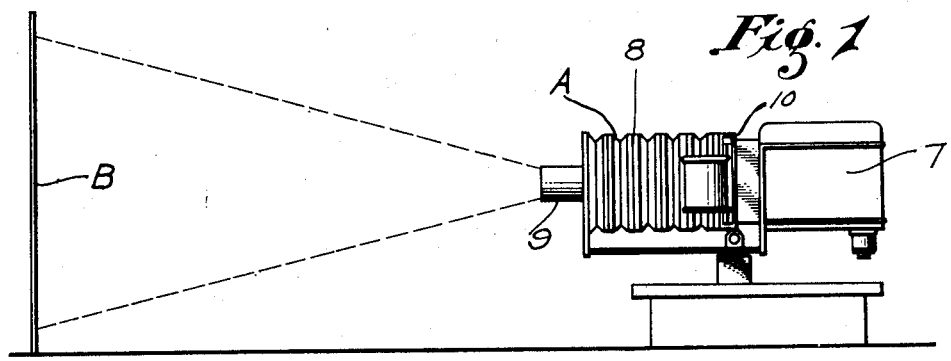
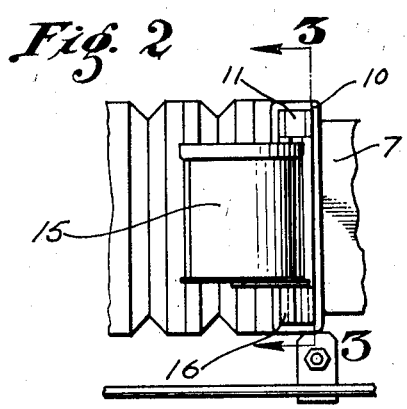
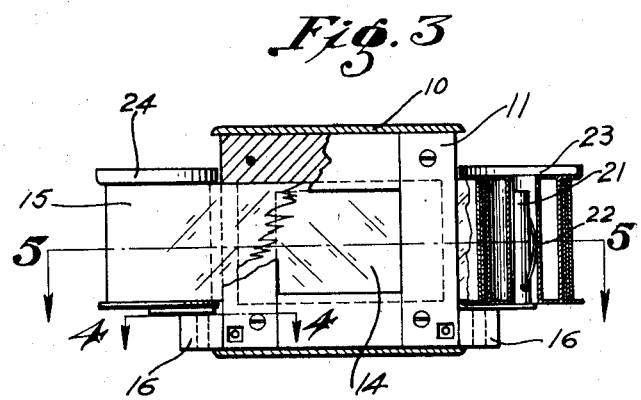
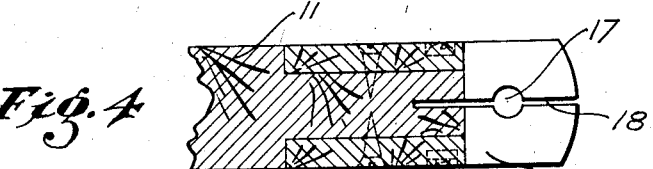
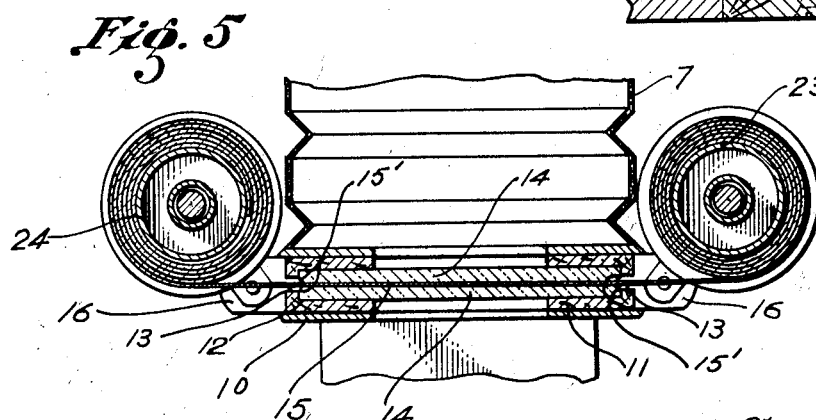
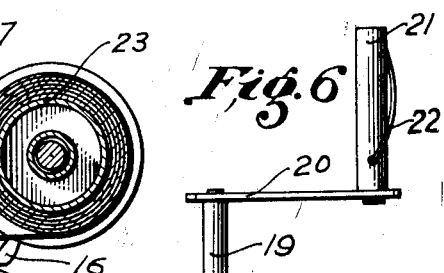
INVENTOR.
Charles W. Perry.
BY Westall and Wallace
ATTORNEYS Patented Aug. 27, 1929.

1,726,120

UNITED STATES PATENT OFFICE.

CHARLES W. PERRY, OF LOS ANGELES, CALIFORNIA, ASSIGNOR TO STILLFILM COMPANY, OF LOS ANGELES, CALIFORNIA, A CORPORATION OF CALIFORNIA.

FILM CARRIER.

Application filed September 25, 1928. Serial No. 308,217.

This invention relates to a film-carrier which may be substituted for the usual slide holder and thereby adapt the machine for projection of the film pictures. The present invention contemplates the provision of a self-contained carrier adapted to be substituted for a slide-holder and arranged so that films may be passed therethrough in a continuous strip. This invention is adapted for intermittent projection of pictures, the change of pictures being manually controlled.

This invention has for its object, the provision of a carrier having any or all of the following features; a carrier-frame having a pair of contiguous loosely mounted transparent plates between which the films may be passed and lips to guide the film into the space between plates upon its insertion; spindles for reel-spools mounted on the frame to hold the magazine and take-up spools; spindles pivotally mounted on the carrier which provides for insertion of the carrier-frame in the machine; and novel resilient frictional means on the spindles to yieldably resist turning of the spools thereon so as to maintain the film taut.

These objects together with other objects and corresponding accomplishments are obtained by means of the embodiment of my invention illustrated in the accompanying drawings, in which:

Fig. 1 is a side elevation showing a stereopticon machine of a well known type mounted for projecting pictures upon a screen; Fig. 2 is a side elevation on an enlarged scale showing a fragment of the machine with the carrier in position; Fig. 3 is a section as seen on the plane indicated by the line marked 3—3 in Fig. 2; Figs. 4 and 5 are sections as seen on the planes correspondingly marked in Fig. 3; and Fig. 6 is a perspective view of one of the spindle members detached from the frame.

Referring with more particularity to the drawings, A indicates in its entirety a projection machine equipped with a carrier embodying my invention. A projection screen is marked B. The projection machine comprises the usual lamp housing 7, a bellows 8 and an objective lens 9. Between the bellows and the lamp housing is the member 10 for receiving the usual slide holders, and in this instance the film carrier. The stereopticon just described forms no part of the present invention, and is merely shown for illustrative purposes. Any other stereopticon adapted to accommodate the usual slide holders may be used.

My invention comprises a picture frame 11 herein shown as rectangular in shape and built up of bars. The nature of the frame assembly is not pertinent to the invention. However, a channel is provided bordering the opening in the frame and marked 12. At opposite sides of the frame are slots 13 opening to the channel and serving for the passage of film therethrough. Loosely mounted in the channel are contiguous glass plates 14, the plates being separable to receive therebetween a strip of film 15. This space between plates is sufficient to permit a strip of film to slide between them and to hold the film flat. The plates have at their edges registering with the slots 13 sloping lips 15¹ to guide the film into position between the plates on insertion. Secured to the frame at the sides and below the slots are brackets 16 having bores 17 to receive stub shafts of spindle members. The brackets are preferably made of resilient material and slit as indicated by 18 so as to yieldably grip the stub shafts when inserted and hold them in adjusted position.

Each spindle member comprises a stub shaft 19 for insertion in the bore 17, an arm 20 and a spindle 21. Encompassing each spindle is a resilient wire 22 of spiral form with its ends mounted in openings in the spindle periphery and projecting a slight distance from the surface of the spindle. Spools indicated by 23 and 24 are mounted upon the spindles. One spool has wound thereon a reel of film having frames of pictures suitable for projection. This spool is the magazine spool, and a like spool serves as the take-up spool.

To place the carrier in position, the spindles are swung out in straight line position with the frame and inserted in the opening made for the glass slide carrier demounted from the frame and the latter substituted for the usual slide holder. A magazine spool, for illustration, a spool 23 is slipped upon a spindle. An empty spool, for illustration spool 24, is placed upon the opposite spindle. The strip of film is then inserted through a slot 13 adjacent to spool 23, the entering edge being guided by the lips between the plates 14; the strip of film is then moved between the plates until it emerges from the opposite slot 13 and it is then attached to spool 24. The spindles are then swung to a position such that the film is maintained taut. Spool 24 may then be manually turned so as to wind the film upon it. The resilient members 22 offer a yielding resistance to turning of the spools, so that there is no slack in the film while the film is being unwound from the magazine spool, both spools may be removed, and the operation performed with another reel of film.

What I claim is:—

1. A film carrier adapted to be substituted for a slide holder in a stereopticon machine comprising a picture frame having an inner channel bordering the opening in said frame, a pair of contiguous transparent plates loosely mounted in said channel to extend across the opening in said frame, said plates being separable to provide a space therebetween to receive a picture transparency, slots in opposite sides of said frame opening to said channel for accommodating said transparency and registering with the separation space between said plates, there being an outwardly sloping lip at the edge of a plate at one of said slots.

2. A film carrier adapted to be substituted for a slide holder in a stereopticon machine comprising a picture frame having an inner channel bordering the opening in said frame, a pair of contiguous transparent plates loosely mounted in said channel to extend across the said opening, said plates being separable to provide a space therebetween to receive a picture transparency, slots in opposite sides of said frame opening to said channel and registering with the separation space between said plates, there being an outwardly sloping lip on opposing sides of said pair of plates at said slots.

3. A film carrier adapted to be substituted for a slide holder in a stereopticon machine comprising a picture frame having an inner channel bordering the opening in said frame, a pair of contiguous transparent plates loosely mounted in said channel to extend across the said opening, said plates being separable to provide a space therebetween to receive a picture transparency, slots in opposite sides of said frame registering with the separation space between said plates and opening to said channel, there being outwardly sloping opposing lips on said plates at said slots.

4. A film carrier adapted to be substituted for a slide holder in a stereopticon machine comprising a picture frame having an inner channel bordering the opening in said frame, a pair of contiguous transparent plates loosely mounted in said channel to extend across the opening in said frame, said plates being separable to provide a space therebetween to receive a picture transparency, slots in opposite sides of said frame opening to said channel for accommodating said transparency and registering with the separation space between said plates, there being an outwardly sloping lip at the edge of a plate at one of said slots, bearing brackets outstanding from said frame at said slots, spindle cranks pivotally mounted in said brackets with reel spool spindles upstanding therefrom and paralleling the sides of said frame.

5. A film carrier adapted to be substituted for a slide holder in a stereopticon machine comprising a picture frame having an inner channel bordering the opening in said frame, a pair of contiguous transparent plates loosely mounted in said channel to extend across the said opening, said plates being separable to provide a space therebetween to receive a picture transparency, slots in opposite sides of said frame opening to said channel and registering with the separation space between said plates, there being an outwardly sloping lip on opposing sides of said pair of plates at said slots, bearing brackets outstanding from said frame of said slots, spindle cranks pivotally mounted in said brackets with reel spool spindles upstanding therefrom and paralleling the sides of said frame.

6. A film carrier adapted to be substituted for a slide holder in a stereopticon machine comprising a picture frame having an inner channel bordering the opening in said frame, a pair of contiguous transparent plates loosely mounted in said channel to extend across the said opening, said plates being separable to provide a space therebetween to receive a picture transparency, slots in opposite sides of said frame registering with the separation space between said plates and opening to said channel, there being outwardly sloping opposing lips on said plates at said slots, bearing brackets outstanding from said frame at said slots, spindle cranks pivotally mounted in said brackets with reel spool spindles upstanding therefrom and paralleling the sides of said frame.

7. A film carrier adapted to be substituted for a slide holder in a stereopticon machine comprising a picture frame having an inner channel bordering the opening in said frame, a pair of contiguous transparent plates loosely mounted in said channel to extend across the opening in said frame, said plates being separable to provide a space therebetween to receive a picture transparency, slots in opposite sides of said frame opening to said channel for accommodating said transparency and registering with the separation space between said plates, there being an outwardly sloping lip at the edge of a plate at one of said slots, bearing brackets outstanding from said frame at said slots, spindle cranks pivotally mounted in said brackets with reel spool spindles upstanding therefrom and paralleling the sides of said frame, a resilient member mounted on each spindle and extending about the periphery thereof to serve as a bearing for spools.

8. A film carrier adapted to be substituted for a slide holder in a stereopticon machine comprising a picture frame having an inner channel bordering the opening in said frame, a pair of contiguous transparent plates loosely mounted in said channel to extend across the said opening, said plates being separable to provide a space therebetween to receive a picture transparency, slots in opposite sides of said frame opening to said channel and registering with the separation space between said plates, there being an outwardly sloping lip on opposing sides of said pair of plates at said slots, bearing brackets outstanding from said frame at said slots, spindle cranks pivotally mounted in said brackets with reel spool spindles upstanding therefrom and paralleling the sides of said frame, a resilient member mounted on each spindle and extending about the periphery thereof to serve as a bearing for spools.

9. A film carrier adapted to be substituted for a slide holder in a stereopticon machine comprising a picture frame having an inner channel bordering the opening in said frame, a pair of contiguous transparent plates loosely mounted in said channel to extend across the said opening, said plates being separable to provide a space therebetween to receive a picture transparency, slots in opposite sides of said frame registering with the separation space between said plates and opening to said channel, there being outwardly sloping opposing lips on said plates at said slots, bearing brackets outstanding from said frame at said slots, spindle cranks pivotally mounted in said brackets with reel spool spindles upstanding therefrom and paralleling the sides of said frame, a resilient member mounted on each spindle and extending about the periphery thereof to serve as a bearing for spools.

In witness that I claim the foregoing I have hereunto subscribed my name this 15th day of September, 1928.

CHARLES W. PERRY.